(12) United States Patent
Chiu et al.

(10) Patent No.: US 12,490,855 B2
(45) Date of Patent: Dec. 9, 2025

(54) FILTER CONTAINER, FILTER ASSEMBLY, AND EXTRACTION DEVICE

(71) Applicant: WISTRON CORP., New Taipei (TW)

(72) Inventors: Chao Hsuan Chiu, New Taipei (TW); Ying Lun Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 877 days.

(21) Appl. No.: 17/714,438

(22) Filed: Apr. 6, 2022

(65) Prior Publication Data

US 2023/0172390 A1    Jun. 8, 2023

(30) Foreign Application Priority Data

Dec. 8, 2021  (TW) .................. 110145853

(51) Int. Cl.
| | | |
|---|---|---|
| *A47J 31/06* | (2006.01) | |
| *A47J 31/00* | (2006.01) | |
| *B01D 25/00* | (2006.01) | |
| *B01D 29/50* | (2006.01) | |

(52) U.S. Cl.
CPC ............. *A47J 31/002* (2013.01); *A47J 31/06* (2013.01); *A47J 31/0626* (2013.01); *A47J 31/0663* (2013.01); *B01D 25/00* (2013.01); *B01D 29/50* (2013.01); *B01D 2201/0407* (2013.01)

(58) Field of Classification Search
CPC .... A47J 31/06; A47J 31/0636; A47J 31/0663; A47J 31/08; A47J 31/057; A47J 31/0626; B01D 2201/0407; B01D 2201/307; B01D 25/00; B01D 29/50

USPC .......... 99/304, 306, 317; 210/435, 445, 447, 210/454, 473, 477, 483, 484, 488
See application file for complete search history.

(56) References Cited

U.S. PATENT DOCUMENTS

| | | | | |
|---|---|---|---|---|
| 767,778 | A * | 8/1904 | Vansant ................ | A47J 31/06 |
| 1,078,171 | A * | 11/1913 | Shaw ................... | A47J 31/06 |
| | | | | 99/422 |
| 1,628,394 | A * | 5/1927 | De Montmorency .. | A47J 31/06 |
| | | | | 99/321 |
| 1,636,179 | A * | 7/1927 | Gehlert ............... | A47J 31/06 |
| | | | | 99/306 |
| 2,770,181 | A * | 11/1956 | Kahan ................. | A47J 31/06 |
| | | | | 99/298 |

(Continued)

FOREIGN PATENT DOCUMENTS

| | | |
|---|---|---|
| CN | 101125056 A | 2/2008 |
| CN | 102316772 A | 1/2012 |

(Continued)

OTHER PUBLICATIONS

EP Office Action dated Nov. 25, 2022 in EP application No. 22179592.5-1016.

(Continued)

*Primary Examiner* — Reginald Alexander
(74) *Attorney, Agent, or Firm* — McClure, Qualey & Rodack, LLP

(57) ABSTRACT

A filter container includes a main part and a filter piece, the main part includes a surrounding portion, an opening, and a coupling portion, the opening and the coupling portion are respectively located at two opposite sides of the surrounding portion, the filter piece is arranged at the coupling portion.

13 Claims, 9 Drawing Sheets

(56) References Cited

U.S. PATENT DOCUMENTS

| | | | | |
|---|---|---|---|---|
| 5,190,653 | A * | 3/1993 | Herrick | B01D 29/05 |
| | | | | 426/77 |
| 6,964,223 | B2 * | 11/2005 | O'Loughlin | A47J 31/02 |
| | | | | 426/433 |
| 8,313,644 | B2 * | 11/2012 | Harris | C02F 1/002 |
| | | | | 210/205 |
| 2006/0162572 | A1 * | 7/2006 | Chiu Liu | A47G 19/16 |
| | | | | 99/317 |
| 2011/0271845 | A1 | 11/2011 | Lee | |
| 2014/0346106 | A1 * | 11/2014 | Anzai | B01D 29/05 |
| | | | | 29/896.6 |
| 2015/0175347 | A1 * | 6/2015 | Empl | B65B 25/001 |
| | | | | 426/433 |
| 2016/0310881 | A1 * | 10/2016 | Beyda | B01D 29/085 |
| 2017/0258260 | A1 * | 9/2017 | Hsu | A47J 31/0626 |
| 2019/0200803 | A1 * | 7/2019 | Chuang | A47J 37/0676 |

FOREIGN PATENT DOCUMENTS

| | | |
|---|---|---|
| CN | 204508988 U | 7/2015 |
| CN | 205963811 U | 2/2017 |
| CN | 208941813 U | 6/2019 |
| CN | 211533999 U | 9/2020 |
| DE | 102006047504 A1 | 4/2008 |
| JP | 2002058598 A | 2/2002 |
| TW | 445942 U | 2/2013 |
| TW | M535520 U | 1/2017 |
| WO | 9210919 | 6/1992 |
| WO | 2012174331 A1 | 12/2012 |
| WO | 2015136267 A1 | 9/2015 |

OTHER PUBLICATIONS

TW Office Action dated Jan. 11, 2023 in Taiwan application No. 110145853.

TW Office Action dated Oct. 21, 2022 in Taiwan application No. 110145853.

TW Office Action dated Oct. 3, 2023 in Taiwan application No. 110145853.

CN Office Action dated Oct. 28, 2025 in Chinese application No. 202210066299.5.

* cited by examiner

FILTER CONTAINER, FILTER ASSEMBLY, AND EXTRACTION DEVICE

CROSS-REFERENCE TO RELATED APPLICATIONS

This non-provisional application claims priority under 35 U.S.C. § 119(a) on Patent Application No(s). 110145853 filed in Taiwan (R.O.C.) on Dec. 8, 2021, the entire contents of which are hereby incorporated by reference.

TECHNICAL FIELD

The disclosure relates to a filter arrangement, more particularly to a filter container for beverage and a filter assembly and an extraction device including the same.

BACKGROUND

With the improvement of living standard, coffee is not only a drink for helping people feel less tired and increase energy levels but more of a casual lifestyle that people are looking for. This makes coffee become more and more popular and also prompts the development of various flavored coffees and new brewing techniques.

It is known that coffee filter is an effective solution to capture unwanted particles in the brewing process. A typical coffee filter generally adopts a filter paper and filter cup and therefore every time the filtering process at least involves troublesome and time-consuming steps, such as removing the filter cup, tossing the filter paper and the grounds into the trash, cleaning the filter cup, reinstalling the filter cup, and placing a new filter paper.

SUMMARY

Accordingly, one aspect of the disclosure is to provide a filter container, a filter assembly, and an extraction device which can significantly reduce the effort for the preparation prior to beverage extraction so as to largely improve the efficiency in making the beverage.

One embodiment of the disclosure provides a filter container including a main part and a filter piece, the main part includes a surrounding portion, an opening, and a coupling portion, the opening and the coupling portion are respectively located at two opposite sides of the surrounding portion, the filter piece is arranged at the coupling portion.

Another embodiment of the disclosure provides a filter assembly includes a support container and a filter container, the support container includes an outlet, the filter container includes a main part and a filter piece, the main part is removably accommodated in the support container, the main part comprises a surrounding portion, an opening, and a coupling portion, the opening and the coupling portion are respectively located at two opposite sides of the surrounding portion, the filter piece is arranged at the coupling portion and corresponding to the outlet.

Another embodiment of the disclosure provides an extraction device includes a main machine and a filter assembly removably accommodated in the main machine, the filter assembly includes a support container including an outlet and a filter container, the filter container includes a main part and a filter piece, the main part is removably accommodated in the support container, the main part includes a surrounding portion, an opening, and a coupling portion, the opening and the coupling portion are respectively located at two opposite sides of the surrounding portion, the filter piece is arranged at the coupling portion and corresponding to the outlet.

According to the filter container, the filter assembly, and the extraction device as discussed in the above embodiments of the disclosure, the filter container has a main part for accommodating the coffee to be filtered and also has a filter piece at one side thereof for filtering the coffee, thus the unwanted particles will remain in the filter container, such that the coffee grounds can be removed along with the removal of the filter container, thereby saving the troublesome and time-consuming works caused by the usage of filter paper and filter cup. In short, the filter container of the disclosure has no need to clean used coffee grounds and also significantly simplifies and reduces the effort of preparation before every time filtering coffee, thereby improving the efficiency in brewing coffee.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
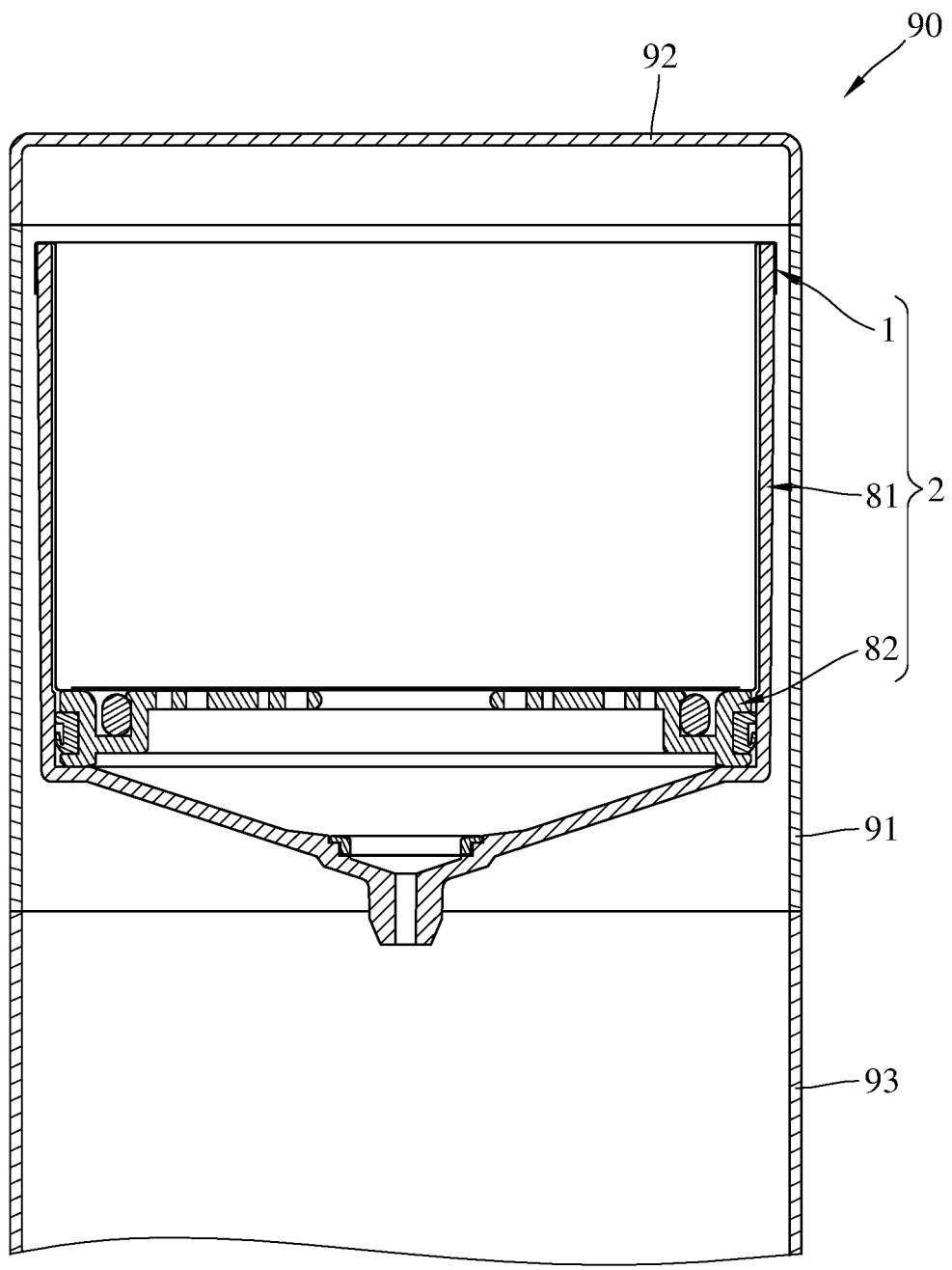
FIG. 1 is a partially enlarged cross-sectional view of an extraction device according to one embodiment of the disclosure.

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted,"

"connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

The following exemplary embodiments will be described with reference to FIGS. 1-9. For ease of explanation, some elements shown in the drawings may be simplified or illustrated by dotted lines while other elements irrelevant to the spirit of the disclosure may be omitted.

Figure 2:
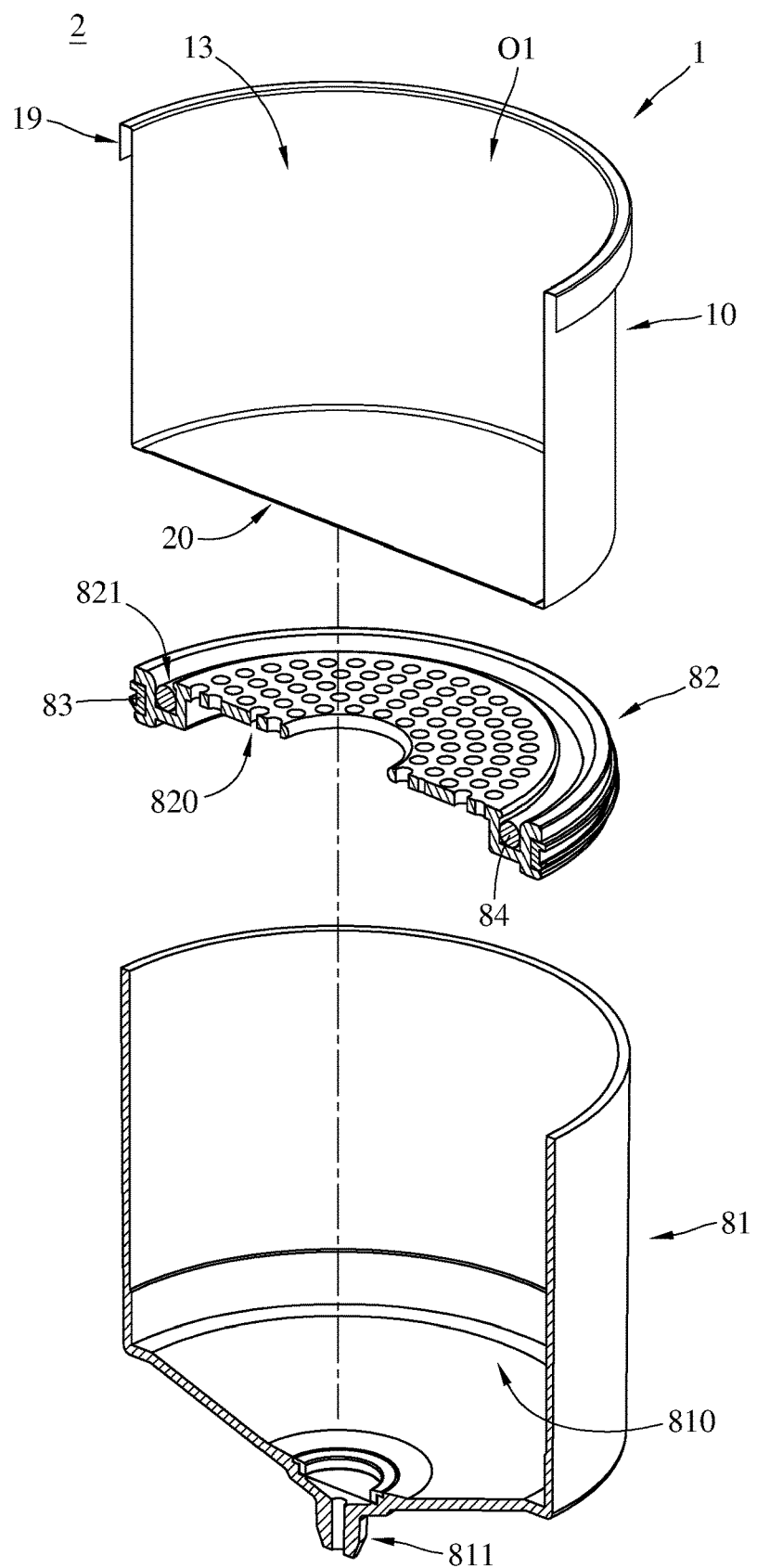
FIG. 2 is an exploded perspective view of a filter assembly according to one embodiment of the disclosure.

Firstly, referring to FIG. 1-2, one embodiment of the disclosure provides an extraction device 9 which may be, but is not limited to, an electronic or non-electronic device capable of accommodating and filtering a mixture of liquid and solid ingredients. The solid ingredient may be ground coffee or tea leaf that contains flavor compounds that can be extracted out and mixed with water to become beverages. The liquid may be, but is not limited to, water or any other substance in liquid form. In one application, the extraction device 9 may be, but is not limited to, a coffee machine or part thereof. Note that the aforementioned liquid, solid particles, and mixture thereof are omitted from the drawings for the purpose of clear illustration.

In specific, the extraction device 9 may include a main machine 90 and a filter assembly 2. The filter assembly 2 is removably accommodated in an outer casing 91 of the main machine 90 and is configured to accommodate and filter the mixture of liquid and solid ingredients. The main machine 90 may be, but is not limited to, the part of the extraction device 9 other than the filter assembly 2. The outer casing 91 may be, but is not limited to, one of the shells of the main machine 90 and may be arranged on or above a collector 93. Note that the outer casing 91 is provided for the explanation but not intended to limit the disclosure. The collector 93 is a container served to collect the mixture of liquid and extracted components coming out of the filter assembly 2. Note that the collector 93 is provided for the explanation but not intended to limit the disclosure. It is also noted that the arrangement of the filter assembly 2, the outer casing 91, and the collector 93 as illustrated in the drawings is for the explanation but not intended to limit the disclosure.

In this embodiment, the filter assembly 2 may include a filter container 1, a support container 81, and a filter plate 82. The support container 81 is removably accommodated in the outer casing 91. The filter plate 82 is removably disposed in the container 81. The filter container 1 is removably disposed in the support container 81 and arranged on or above the filter plate 82. The filter container 1 is configured to accommodate and filter the mixture of liquid and solid ingredients, and the mixture of liquid and extracted components are allowed to flow through the filter plate 82 and the bottom of the support container 81 and then to be collected by the collector 93 underneath the filter assembly 2.

In specific, the support container 81 may include an accommodation space 810 and an outlet 811, the accommodation space 810 is configured to accommodate the filter container 1 and the filter plate 82, the outlet 811 is connected to the accommodation space 810 and located at a side of the support container 81 close to the collector 93, such that the accommodation space 810 may be in fluid communication with the collector 93 through the outlet 811. The filter plate 82 is arranged between the filter container 1 and the outlet 811 of the support container 81. The filter plate 82 may include a filter structure 820. The filter structure 820 has one or more holes in a suitable size to allow the mixture of liquid and extracted components to pass through. Thus, the filter container 1 may be in fluid communication with the outlet 811 through the filter structure 820. Additionally or optionally, the filter assembly 2 may further include a gasket 83 arranged between the edge of the filter structure 820 and the inner surface of the support container 81, the gasket 83 may be made of rubber and is able to ensure a required watertightness in the periphery of the filter structure 820.

The filter container 1 may include a main part 10 and a filter piece 20 arranged at a side of the main part 10. The main part 10 is made of any suitable material that is water-impermeable. The main part 10 defines and surrounds a space for accommodating the mixture of liquid and solid ingredients. The filter piece 20 is arranged at a side of the main part 10. As shown, when the filter container 1 is placed in the support container 81, the filter piece 20 corresponds to the filter structure 820 of the filter plate 82. At least part of the filter piece 20 is water-permeable so as to allow the liquid and the component extracted from the solid ingredient to pass through while it has a porosity and pore aperture size capable of stopping the solid ingredient from passing through. In short, the main part 10 is water-impermeable so it can hold liquid substance while the filter piece 20 is in a proper water-permeable that permits the liquid and extracted components to pass through but blocks the unwanted solid substance in the main part 10.

Figure 3:
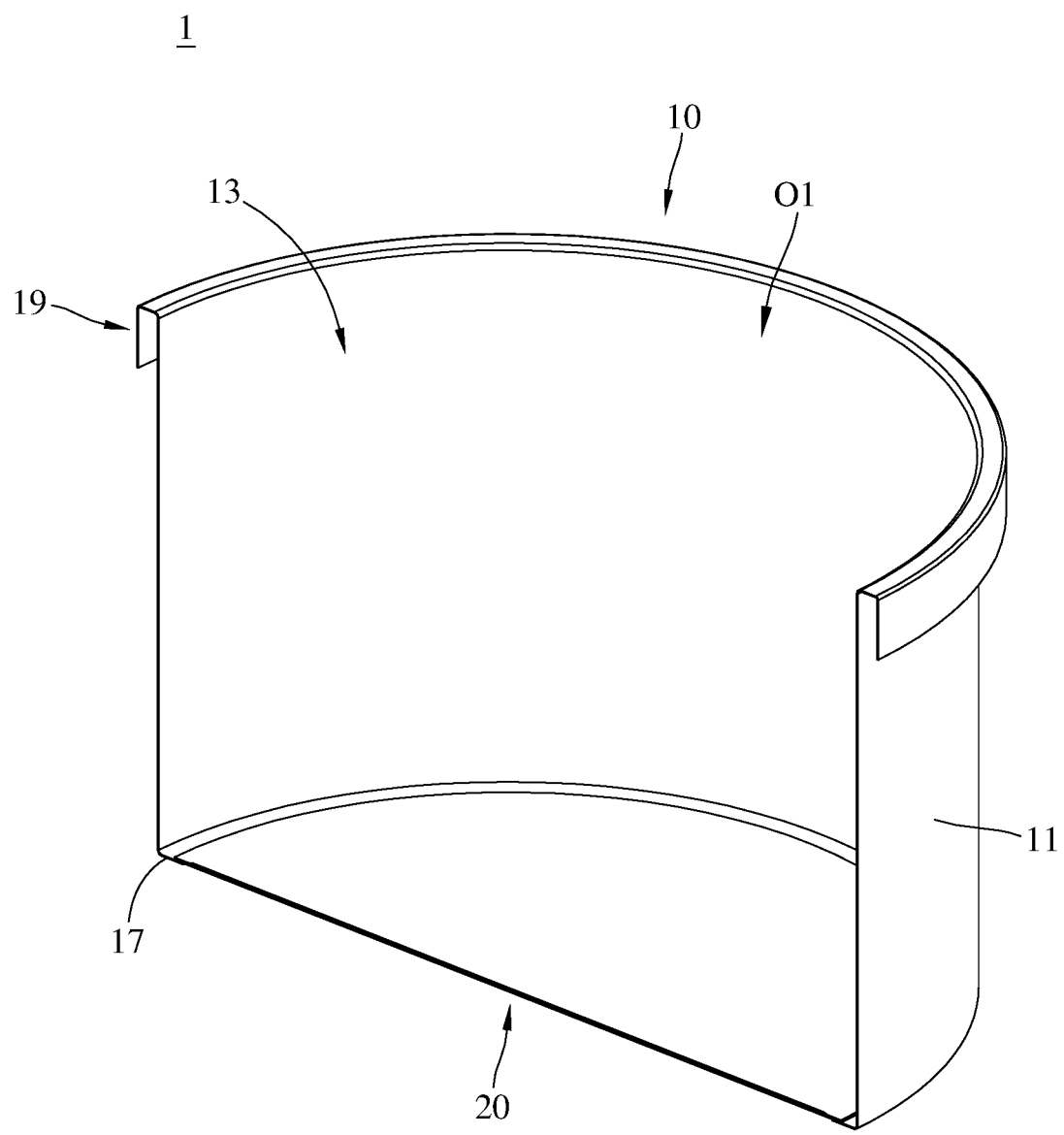
FIG. 3 is a cross-sectional perspective view of a filter container according to one embodiment of the disclosure.
Figure 4:
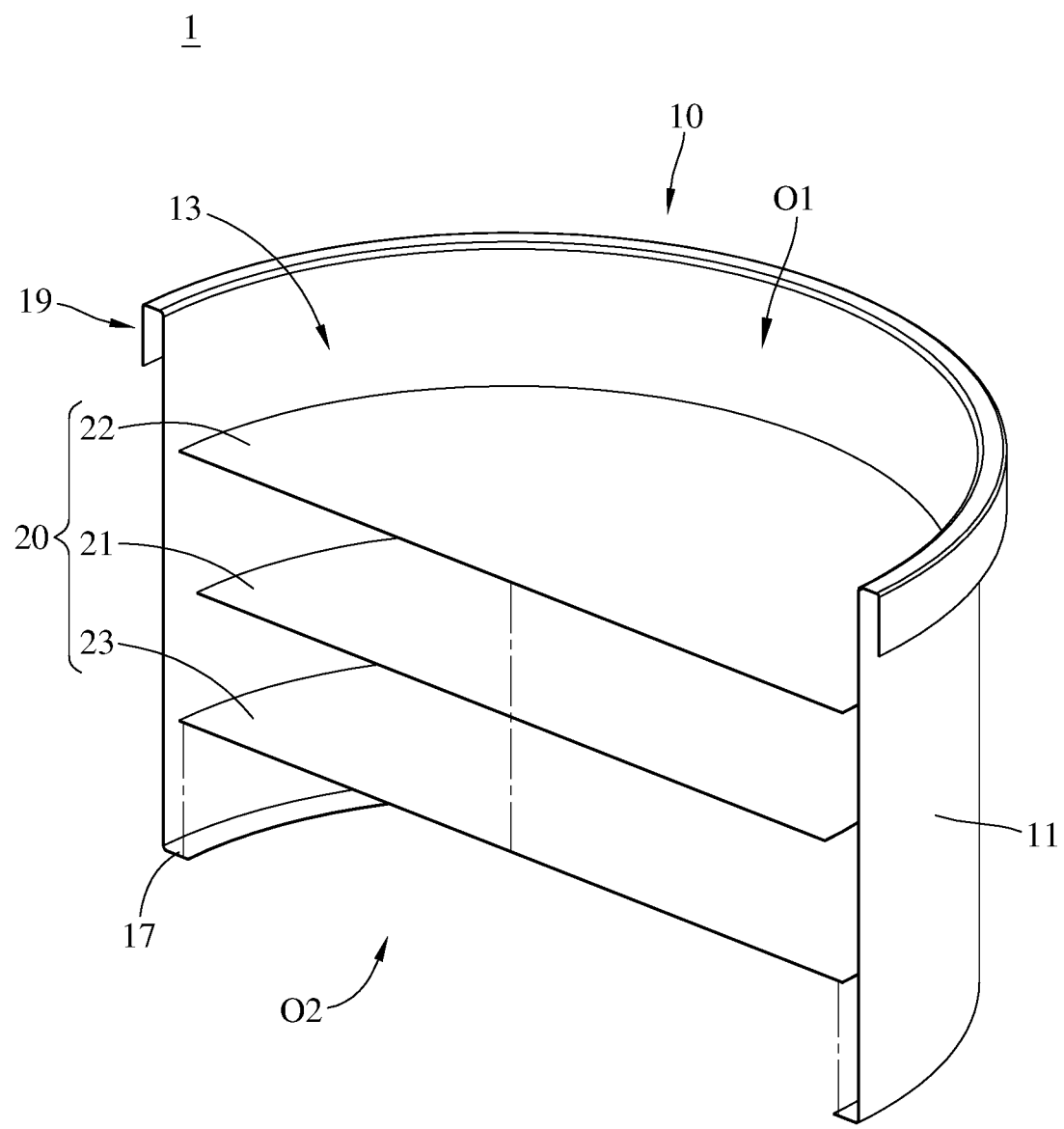
FIG. 4 is a cross-sectional exploded view of a filter container according to one embodiment of the disclosure.
Figure 5:
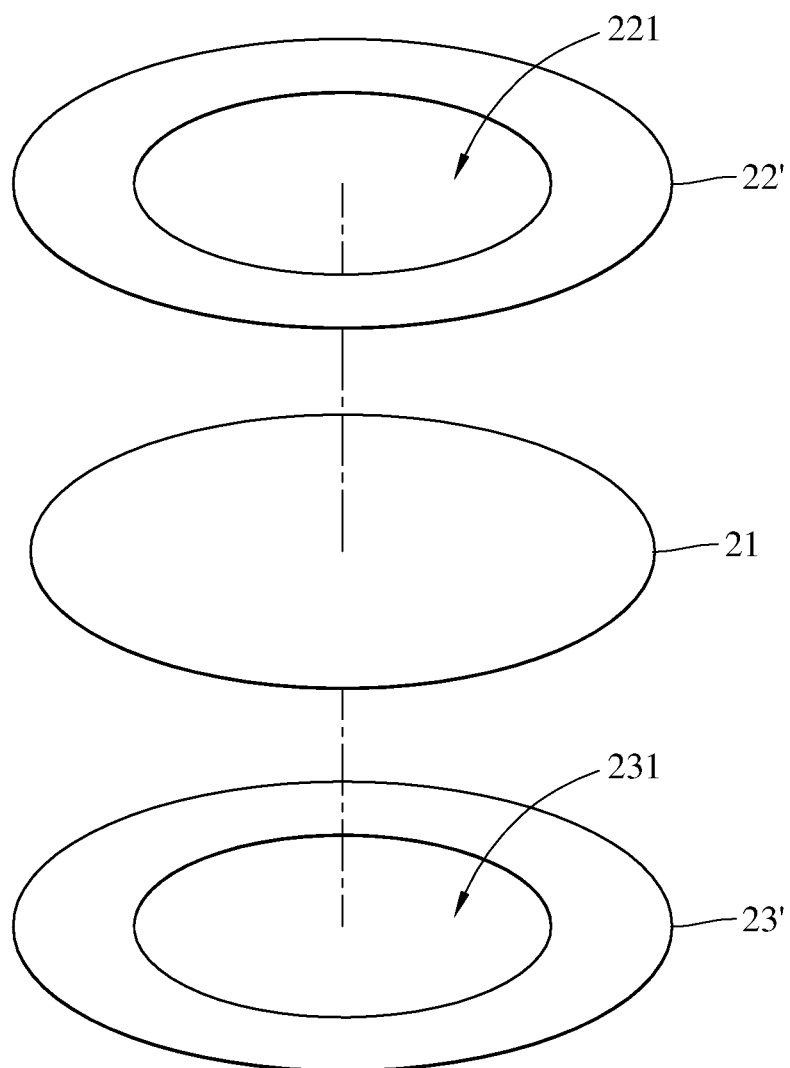
FIG. 5 is an exploded perspective view of a filter piece according to one embodiment of the disclosure.

Further detail of the filter container 1 is provided with reference to FIGS. 3-4. The main part 10 may be, but is not limited to, integrally formed of a single piece made of any suitable water-impermeable material. For example, the main part 10 may be made of polyethylene (PE), but the disclosure is not limited thereto. As long as that the main part 10 is able to hold liquid substance, the flexibility, stiffness, or other properties of the main part 10 may be adjusted or changed as required. For example, the main part 10 may be made of flexible material that can make the main part 10 easily to be folded and convenient for use or disposal. Alternatively, in some other embodiments, the main part 10 may be made of material that can make the main part 10 stiff enough to keep shape.

In this embodiment, the main part 10 may include a surrounding portion 11, an accommodation portion 13, an attaching portion 17, and a reversely folded portion 19. The accommodation portion 13 is the hollow area defined by the surrounding portion 11. Further, the surrounding portion 11 also define an opening O1 at a side of the accommodation portion 13. The opening O1 exposes the accommodation portion 13. The attaching portion 17 and the reversely folded portion 19 are respectively located at two opposite sides of the surrounding portion 11. In specific, the attaching portion 17 extends inward from one of annular edges (not numbered) of the surrounding portion 11 so as to form a slim ring-shaped structure connected to the edge of the surrounding portion 11. The attaching portion 17 provides an area for the filter piece 20 to attach to the main part 10. In FIG. 4, the attaching portion 17 defines a coupling portion O2 located at another side of the accommodation portion 13, as shown, the opening O1 and the coupling portion O2 are respectively located at two opposite sides of the surrounding portion 11. The reversely folded portion 19 may be part of the surrounding portion 11 located away from the attaching portion 17.

When the filter container 1 is accommodated within the accommodation space 810, the reversely folded portion 19 may be hung or hooked on the upper edge (not numbered) of the contain 81 so as to secure the position of the filter container 1 relative to the accommodation space 810.

The filter piece 20 is arranged at the side of the surrounding portion 11 located close to the coupling portion O2; in other words, the filter piece 20 is arranged at the side of the surrounding portion 11 located away from the opening O1. When the filter container 1 is installed in the support container 81, the filter piece 20 is arranged at a side of the main part 10 close to the outlet 811 of the contain 81. In this embodiment, the filter piece 20 may include multiple layers. For example, as shown, the filter piece 20 may include a first layer 21, a second layer 22, and a third layer 23. Among these layers, at least the first layer 21 is water-permeable and has a proper porosity. The "proper" porosity means that the indicated layers are able to allow the liquid substance to pass through but prevent the unwanted solid substance from passing through. The first layer 21 may be clamped by the second layer 22 and the third layer 23. Optionally, two opposite surfaces of the first layer 21 may respectively be fully covered by the second layer 22 and the third layer 23. The periphery of at least one of the second layer 22 and the third layer 23 is fixed to the attaching portion 17 in any suitable manner, such that the filter piece 20 can be fixed to the main part 10 and cover the coupling portion O2.

The first layer 21 may be made of material the same as any typical filter paper, such as crepe paper. The second layer 22 and the third layer 23 may be made of non-woven fabric, such as polypropylene (PP), polyester (PET), or polyethylene (PE). In one example, the first layer 21, the second layer 22, and the third layer 23 may each be water-permeable and have a proper porosity, such that the filter piece 20 can provide a triple filter to effectively filter out the unwanted substance. In this example, the second layer 22, the third layer 23, and the main part 10 may be made of heat fusible thermoplastic material, thus, parts of the second layer 22 and the third layer 23 are allowed to be fused to the attaching portion 17 of the main part 10.

Note that the materials, shapes, proportions, water permeability, porosities of the first layer 21, the second layer 22, and the third layer 23 are exemplary but not intended to limit the disclosure. For example, please see FIG. 5, an exploded view of a filter piece 20' according to another embodiment of the disclosure is provided, as shown, a second layer 22' and a third layer 23' may each have a hollow area or through hole at the center of the filter piece 20', thus at least part of the first layer 21 is not covered by the second layer 22' and the third layer 23'. In specific, the second layer 22' may have a hollow portion 221, the third layer 23' may have a hollow portion 223, the hollow portion 221 and the hollow portion 223 respectively expose two opposite surfaces of the first layer 21. In such an arrangement, the second layer 22' and the third layer 23' may be heat fusible but may not be water-impermeable, the second layer 22' and the third layer 23' are still able to clamp and hold the first layer 21 inbetween, and the filter piece 20' may only rely on the first layer 21 to filter out the unwanted substance.

In the case that the main part 10 is stiff enough to keep its shape, the main part 10 may not rely on hanging the reversely folded portion 19 on the upper edge of the container 81 to maintain its shape when being placed in the support container 81. On the other hand, when the material of the main part 10 is unable to keep the shape of the main part 10, other than the reversely folded portion 19 to fix the upper portion of the filter container 1 to the support container 81, the lower portion of the filter container 1 can be fixed to the filter plate 82 underneath the filter piece 20.

Figure 6:
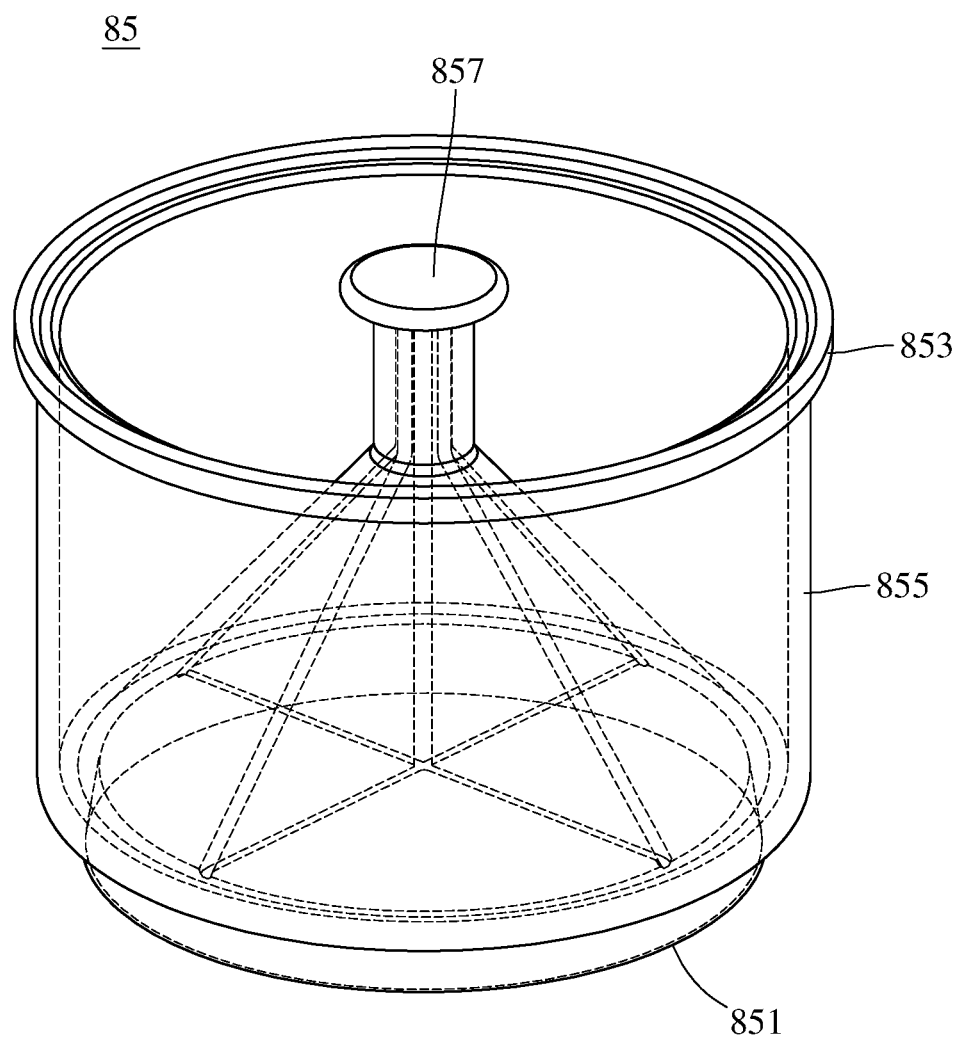
FIG. 6 is a perspective view of a jig according to one embodiment of the disclosure.
Figure 7:
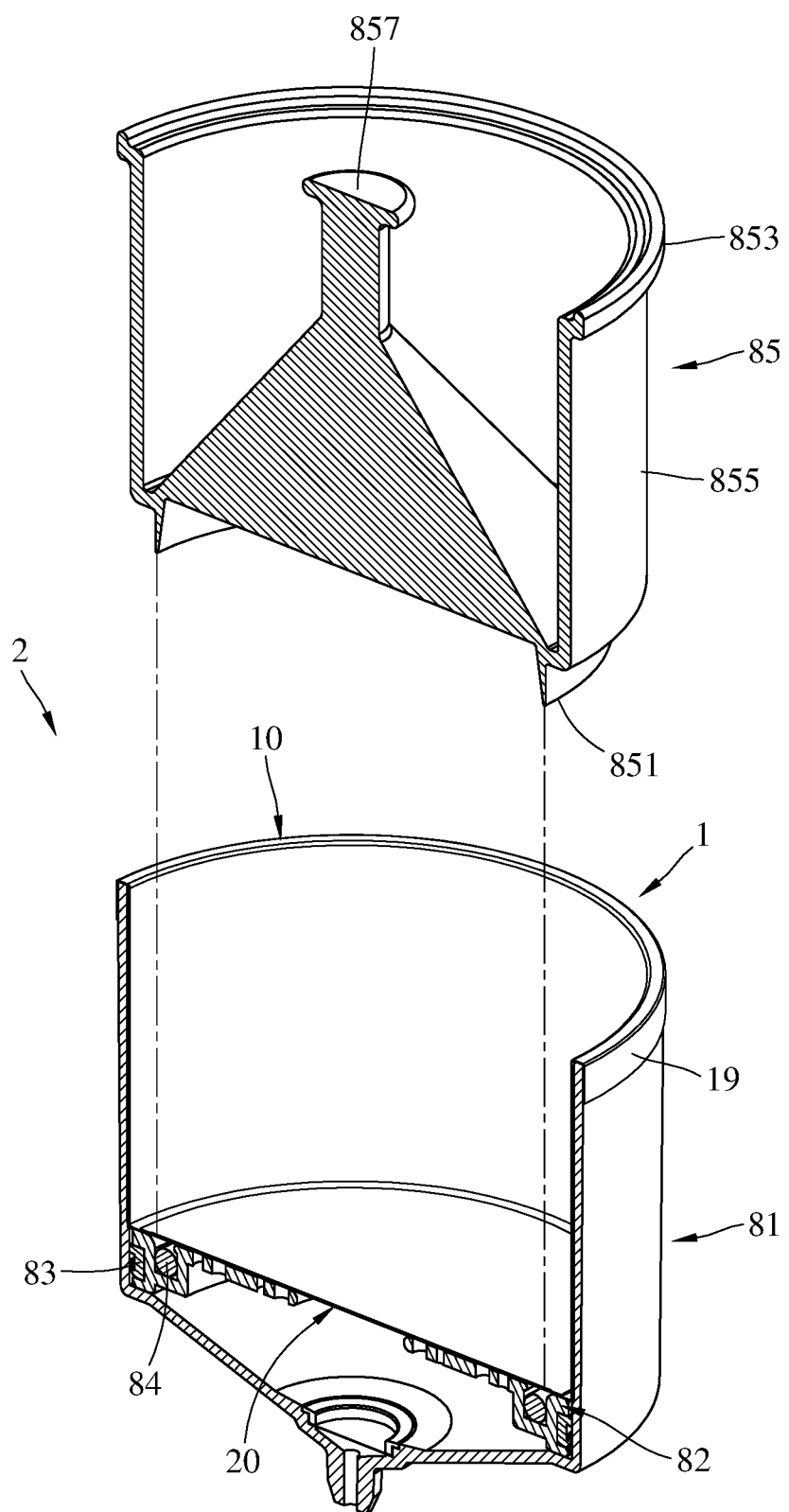
FIGS. 7-8 depict the operation of the jig according to one embodiment of the disclosure.
Figure 8:
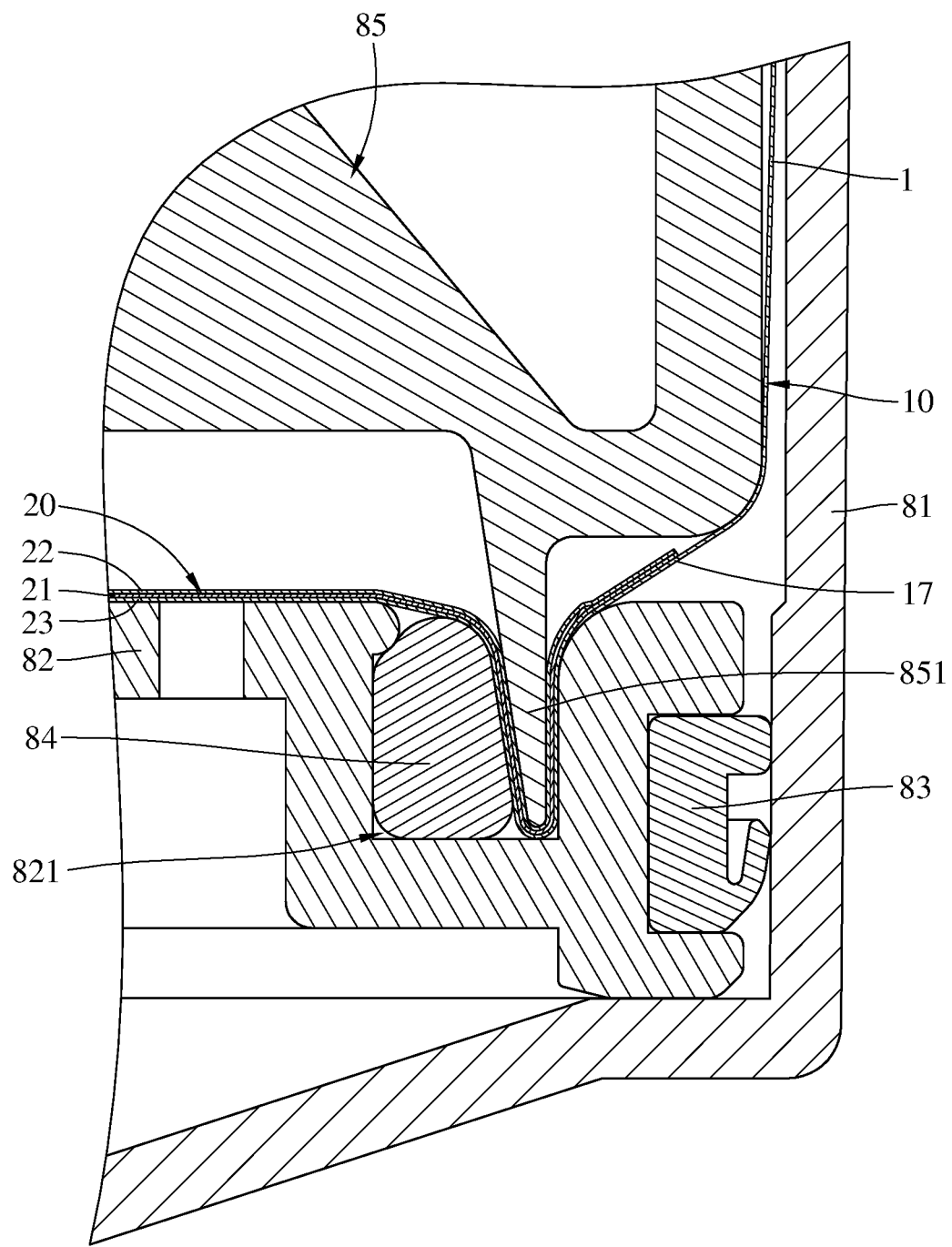
Figure 9:
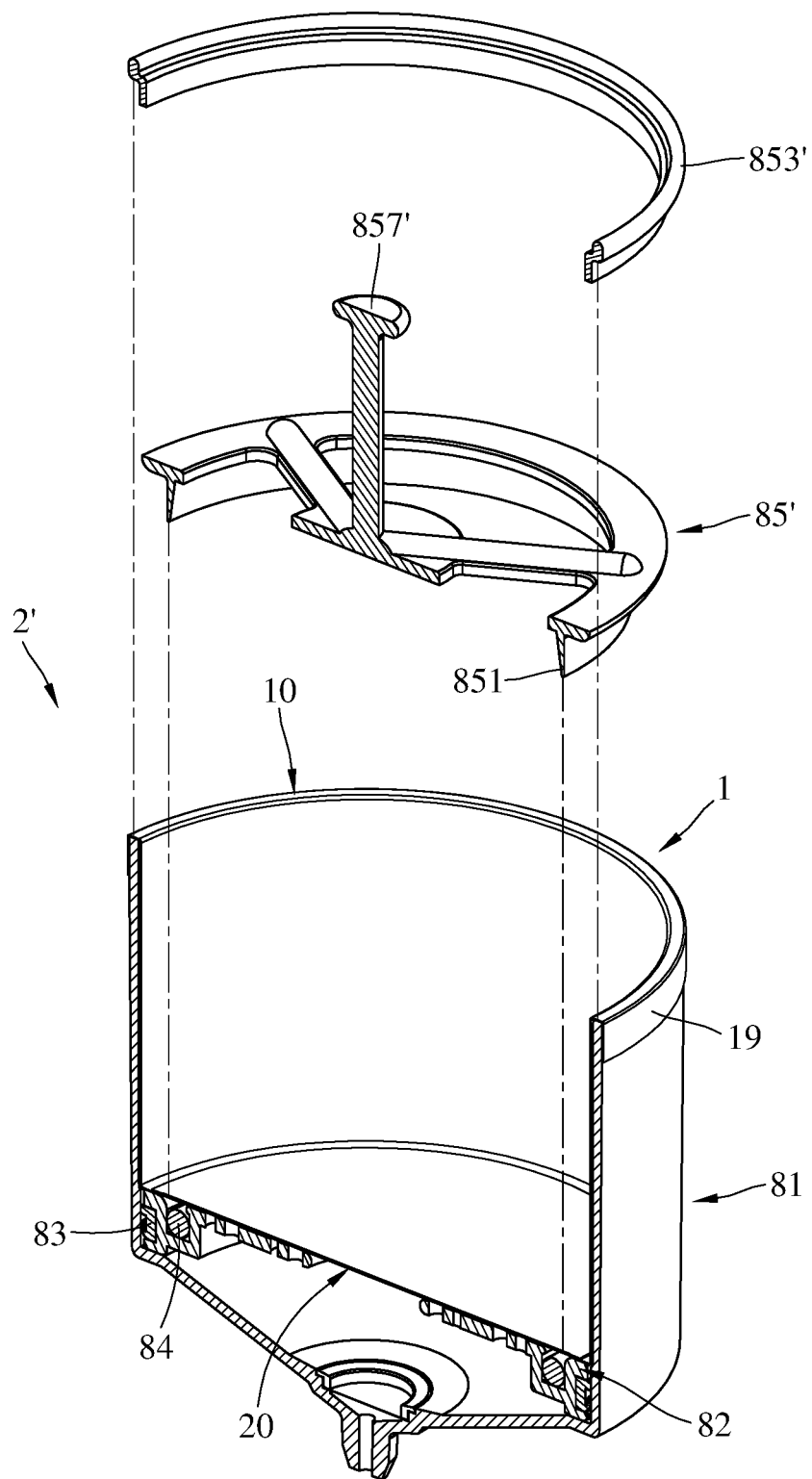
FIG. 9 is an exploded view of a filter assembly according to another embodiment of the disclosure.

In specific, please refer to FIG. 2 and further refer to FIGS. 6-8, in this embodiment, the filter assembly 2 may further include a gasket 84 and a jig 85, and the filter plate 82 may further include a groove 821. The groove 821 may be located on a surface of the filter plate 82 facing the filter container 1. The groove 821 surrounds the filter structure 820. The gasket 84 may be made of rubber. The gasket 84 is located in the groove 821. The jig 85 may be integrally formed of a single piece made of any suitable plastic or metal. The jig 85 may include an insertion portion 851, a flange portion 853, a connecting portion 855, and a handle portion 857. The handle portion 857 a handheldable part of the jig 85. The insertion portion 851 is located at a side of the jig 85 opposite to the handle portion 857. The insertion portion 851 extends outward and is tapered towards a direction away from the handle portion 857. As shown, it is understood that the insertion portion 851 is in a ring shape and corresponds to the groove 821. The connecting portion 855 is connected to and located between the insertion portion 851 and the flange portion 853. The flange portion 853 is a bent portion located at an edge of the connecting portion 855 away from the insertion portion 851.

As shown in FIG. 7, the filter container 1 can be firstly placed into the container 81, the reversely folded portion 19 of the main part 10 can be hung on the upper edge of the support container 81, then, the jig 85 can be placed into the accommodation portion 13 of the filter container 1. As shown in FIG. 8, the insertion portion 851 of the jig 85 can be inserted into the gap between the gasket 84 and the surface of the filter plate 82 defining the groove 821. By doing so, the insertion portion 851 is able to push the overlapping of the filter piece 20 and the attaching portion 17 into the gap, such that the filter piece 20 can be firmly fixed to the filter plate 82. Meanwhile, the flange portion 853 of the jig 85 will be placed on the reversely folded portion 19 of the filter container 1 so as to keep the reversely folded portion 19 at the upper edge of the support container 81. As discussed, the use of the jig 85 is able to fix the bottom portion of the filter container 1 to the filter plate 82 and also to hold the position of the upper portion of the filter container 1 relative to the support container 81, thereby securing the installation of the filter container 1 into the support container 81. After the filter container 1 is installed in place, the jig 85 may be removed.

Note that the operation of the jig 85 is not limited by the aforementioned steps. In one example, the filter container 1 can be sleeved on the jig 85 before it is placed into the support container 81, in this case, the jig 85 and the filter container 1 can be put into the container 81 together, the reversely folded portion 19 and the filter piece 20 of the filter container 1 still can be fixed to the upper edge and the groove 821 by the jig 85.

Note that the aforementioned jig 85 is exemplary. Please refer to FIG. 9, a filter assembly 2' according to another embodiment of the disclosure is provided, as shown, the filter assembly 2' may adopt a jig 85' made of two pieces. In specific, a flange portion 853' of the jig 85' may be a single piece, and an insertion portion 851' and a handle portion 857' of the jig 85' may be formed together to be another piece. In such an arrangement, the placement of the insertion portion 851' into the groove 821 of the support container 81 and the placement of the flange portion 853' onto the reversely folded portion 19 of the filter container 1 are separated steps.

With the aforementioned exemplary and not limiting embodiments, it will be apparent to those skilled in the art that various modifications and variations without departing from the scope or spirit of the disclosure can be made as required. For example, the extraction device 9 may further include a lid 92 (as shown in FIG. 1), the lid 92 is detachably disposed on the top of the outer casing 91 so that the lid 92 and the outer casing 91 are able to accommodate the filter assembly 2 therewithin. For example, the first layer may be made of crepe paper, the second layer may be a ring-shaped sheet made of water-impermeable and heat fusible material, and the third layer may be a circular sheet made of non-woven fabric, in this case, the second layer and the third layer can be fused to the main part while holding the first layer inbetween. For example, the filter piece may include more than three layers. For example, the filter container may be in any other shape as required. For example, the filter assembly may omit the filter plate, in this case, the filter container can be directly placed into the support container. For example, the filter container may be applied to a coffee filter cup.

According to the filter container, the filter assembly, and the extraction device as discussed in the above embodiments of the disclosure, the filter container has a main part for accommodating the coffee to be filtered and also has a filter piece at one side thereof for filtering the coffee, thus the unwanted particles will remain in the filter container, such that the coffee grounds can be removed along with the removal of the filter container, thereby saving the troublesome and time-consuming works caused by the usage of filter paper and filter cup. In short, the filter container of the disclosure has no need to clean used coffee grounds and also significantly simplifies and reduces the effort of preparation before every time filtering coffee, thereby improving the efficiency in brewing coffee.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A filter container comprising:
a main part comprising a surrounding portion, an opening, and a coupling portion, wherein the opening and the coupling portion are respectively located at two opposite sides of the surrounding portion; and
a filter piece arranged at the coupling portion;
wherein the filter piece comprises a first layer, a second layer, and a third layer, part of the first layer is located between the second layer and the third layer, periphery of the first layer is attached to the second layer and the third layer, one of the second layer and the third layer is fixed to the main part, and the second layer and the third layer respectively partially expose two opposite surfaces of the first layer; and
wherein the main part further comprises an attaching portion, the attaching portion radially extends inward from an annular end edge located away from the opening of the surrounding portion, the coupling portion is defined by the attaching portion, and the filter piece is fixed to the attaching portion.

2. The filter container according to claim 1, wherein the main part and at least one of the second layer and the third layer are made of heat fusible thermoplastic material.

3. The filter container according to claim 2, wherein the first layer is made of paper, the second layer and the third layer are made of non-woven fabric.

4. The filter container according to claim 1, wherein the main part further comprises a reversely folded portion located at a side of the surrounding portion located away from the attaching portion.

5. The filter container according to claim 4, wherein at least part of the first layer is clamped by and located between the second layer and the third layer, the main part is water-impermeable, and part of the second layer and part of the third layer which are adjacent to periphery of the first layer are fused with the attaching portion.

6. A filter assembly, comprising:
a support container, comprising an outlet; and
a filter container, comprising:
a main part, removably accommodated in the support container, wherein the main part comprises a surrounding portion, an opening, and a coupling portion, wherein the opening and the coupling portion are respectively located at two opposite sides of the surrounding portion; and
a filter piece, arranged at the coupling portion and corresponding to the outlet;
wherein the filter piece comprises a first layer, a second layer, and a third layer, part of the first layer is located between the second layer and the third layer, periphery of the first layer is attached to the second layer and the third layer, one of the second layer and the third layer is fixed to the main part, and the second layer and the third layer respectively partially expose two opposite surfaces of the first layer.

7. The filter assembly according to claim 6, wherein the main part and at least one of the second layer and the third layer are made of heat fusible thermoplastic material.

8. The filter assembly according to claim 6, wherein the main part further comprises an attaching portion and a reversely folded portion, the attaching portion radially extends inward from an annular end edge located away from the opening of the surrounding portion, the coupling portion is defined by the attaching portion, and the filter piece is fixed to the attaching portion, the reversely folded portion is located at a side of the surrounding portion located away from the attaching portion.

9. The filter assembly according to claim 8, wherein at least part of the first layer is clamped by and located between the second layer and the third layer, the main part is water-impermeable, and part of the second layer and part of the third layer which are adjacent to periphery of the first layer are fused with the attaching portion.

10. The filter assembly according to claim 6, further comprising a filter plate, removably accommodated within the support container and located between the filter piece of the filter container and the outlet.

11. The filter assembly according to claim 10, further comprising a gasket, wherein the filter plate has a groove, and the gasket is located in the groove.

12. An extraction device, comprising:
a main machine; and
a filter assembly, removably accommodated in the main machine, comprising:
a support container, comprising an outlet; and
a filter container, comprising:
a main part, removably accommodated in the support container, wherein the main part comprises a surrounding portion, an opening, and a coupling portion, the opening and the coupling portion are respectively located at two opposite sides of the surrounding portion; and a filter piece, arranged at the coupling portion and corresponding to the outlet;

wherein the filter piece comprises a first layer, a second layer, and a third layer, part of the first layer is located between the second layer and the third layer, periphery of the first layer is attached to the second layer and the third layer, one of the second layer and the third layer is fixed to the main part, and the second layer and the third layer respectively partially expose two opposite surfaces of the first layer.

13. The extraction device according to claim 12, wherein the main part further comprises a attaching portion connected to the surrounding portion and defining the coupling portion, the second layer and the third layer clamp at least part of the first layer, the main part is water-impermeable, and part of the second layer and part of the third layer which are adjacent to periphery of the first layer are fused with the attaching portion.

* * * * *